United States Patent
Murphy et al.

(10) Patent No.: US 10,444,975 B2
(45) Date of Patent: Oct. 15, 2019

(54) GRAPHICAL ICON MANIPULATION

(71) Applicant: Google LLC, Mountain View, CA (US)

(72) Inventors: David Joseph Murphy, San Francisco, CA (US); Alan Lee Gardner, III, Mountain View, CA (US); Ariel Benjamin Sachter-Zeltzer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/652,492

(22) Filed: Jul. 18, 2017

(65) Prior Publication Data

US 2019/0025999 A1    Jan. 24, 2019

(51) Int. Cl.
  *G06F 3/0486*  (2013.01)
  *G06F 3/0481*  (2013.01)
  *G06F 3/0482*  (2013.01)
  *G06F 3/0488*  (2013.01)

(52) U.S. Cl.
  CPC .......... *G06F 3/0486* (2013.01); *G06F 3/0482* (2013.01); *G06F 3/0488* (2013.01); *G06F 3/04817* (2013.01)

(58) Field of Classification Search
  CPC .. G06F 3/04812; G06F 3/0484; G06F 3/0486; G06F 3/0488
  See application file for complete search history.

(56) References Cited

U.S. PATENT DOCUMENTS

| | | | |
|---|---|---|---|
| 5,414,809 A | 5/1995 | Hogan et al. | |
| 6,025,844 A | 2/2000 | Parsons | |
| 6,502,006 B1 * | 12/2002 | Laufer | D05B 19/085 112/102.5 |
| 8,656,296 B1 * | 2/2014 | Ouyang | G06F 3/0488 715/256 |
| 9,150,147 B2 * | 10/2015 | Brush | G06F 3/0482 |
| 9,740,381 B1 * | 8/2017 | Chaudhri | G06F 3/04845 |
| 2003/0033424 A1 * | 2/2003 | Gould | G06T 1/20 709/233 |

(Continued)

OTHER PUBLICATIONS

PCT International Search Report and Written Opinion in International Application No. PCT/US2018/042381, dated Sep. 4, 2018, 14 pages.

*Primary Examiner* — Steven P Sax

(74) *Attorney, Agent, or Firm* — Fish & Richardson P.C.

(57) ABSTRACT

Methods, systems, and apparatus, including computer programs encoded on a computer storage medium, for graphical icon manipulation. In one aspect, a method includes the actions of receiving a user input that corresponds to a selection of a graphical item that is located in a first portion of the graphical interface. The actions further include receiving a translation input that corresponds to a drag of the graphical item. The actions further include determining that a location of the selection input is in a second portion of the graphical interface. The actions further include updating the graphical item by providing, in place of the graphical item, a representation of a change to the graphical item based on the graphical item being placed in the second portion. The actions further include determining that the selection input has ceased. The actions further include providing, for output, the change to the graphical item.

20 Claims, 9 Drawing Sheets

(56) References Cited

U.S. PATENT DOCUMENTS

| | | | |
|---|---|---|---|
| 2003/0085899 A1* | 5/2003 | Gould | G06T 15/005 |
| | | | 345/473 |
| 2003/0120711 A1 | 6/2003 | Katz | |
| 2004/0205691 A1* | 10/2004 | Poole | G06F 8/20 |
| | | | 717/100 |
| 2005/0289109 A1* | 12/2005 | Arrouye | G06F 16/248 |
| 2005/0289111 A1* | 12/2005 | Tribble | G06F 16/90335 |
| 2006/0070007 A1* | 3/2006 | Cummins | G06F 3/0486 |
| | | | 715/769 |
| 2008/0033777 A1 | 2/2008 | Shukoor | |
| 2009/0106011 A1* | 4/2009 | Chen | G06F 8/10 |
| | | | 703/17 |
| 2009/0158186 A1 | 6/2009 | Bonev et al. | |
| 2010/0241994 A1* | 9/2010 | Wiley | G06F 3/04842 |
| | | | 715/832 |
| 2010/0332581 A1* | 12/2010 | Mills | G06F 8/34 |
| | | | 709/202 |
| 2010/0333008 A1 | 12/2010 | Taylor | |
| 2012/0084689 A1* | 4/2012 | Ledet | G06F 3/0486 |
| | | | 715/769 |
| 2012/0198374 A1* | 8/2012 | Zhang | G06F 3/0486 |
| | | | 715/769 |
| 2013/0113716 A1* | 5/2013 | Williams | G06F 3/0488 |
| | | | 345/173 |
| 2013/0145325 A1 | 6/2013 | Ording | |
| 2013/0174070 A1* | 7/2013 | Briand | G06F 3/04817 |
| | | | 715/769 |
| 2014/0297516 A1* | 10/2014 | Brown | G06F 3/04817 |
| | | | 705/39 |
| 2015/0049083 A1* | 2/2015 | Bidne | G06T 19/006 |
| | | | 345/420 |
| 2016/0239167 A1 | 8/2016 | Reimann et al. | |
| 2017/0046024 A1* | 2/2017 | Dascola | H04M 1/72522 |

\* cited by examiner

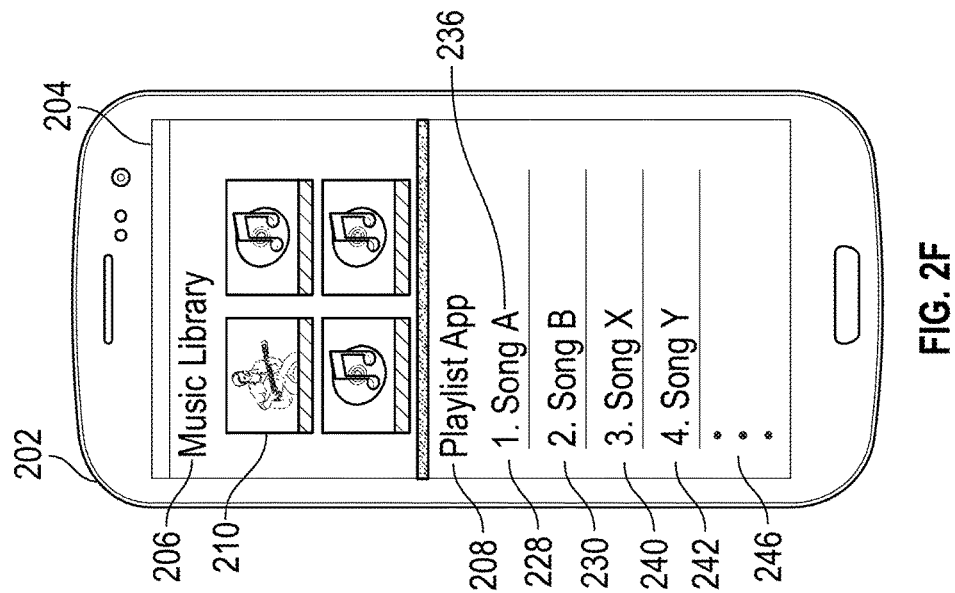
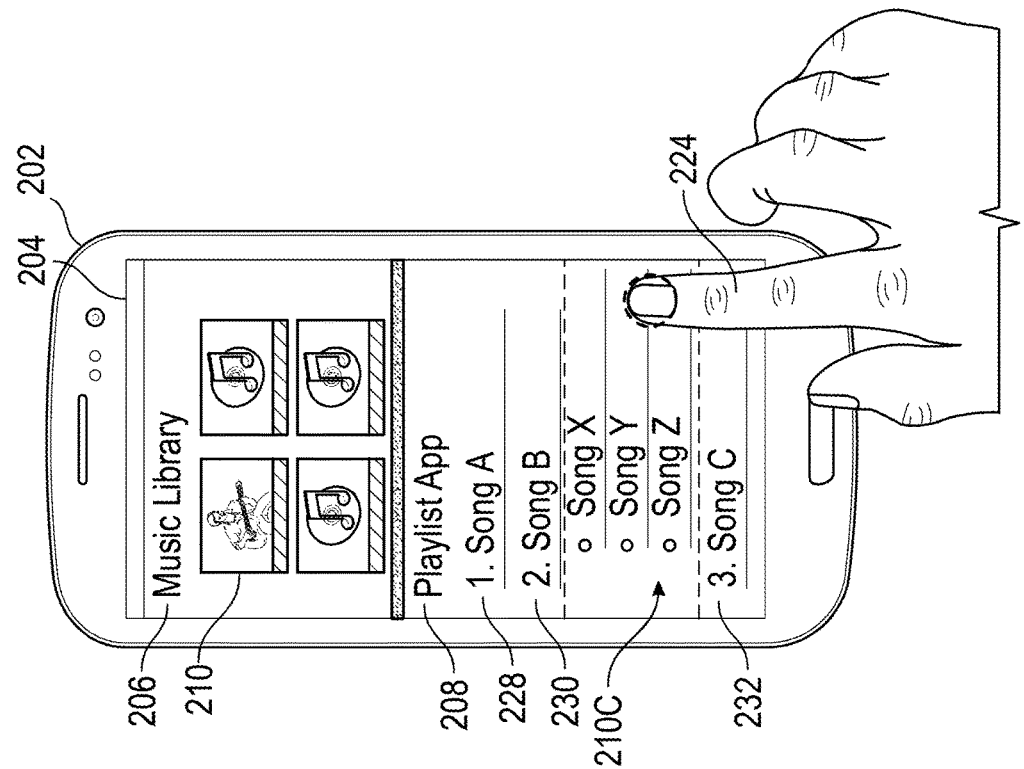
FIG. 2E
FIG. 2F

GRAPHICAL ICON MANIPULATION

FIELD

This specification generally relates to graphical user interfaces.

BACKGROUND

A graphical user interface ("GUI") is a type of user interface that allows users to interact with electronic devices through graphical icons and visual indicators instead of text-based user interfaces such as typed commands. The user performs actions through direct manipulation of the graphical icons and visual elements.

SUMMARY

A user may move an icon around a GUI by dragging the icon from one location to another location. Typically, an operating system may provide an indication of whether the user's action will result in a cut and paste of the icon and its underlying file, or other types of data, a copy of the icon and its underlying file, or a creation of a shortcut to the underlying file. For example, the operating system may augment the icon with a plus symbol in instances where the underlying file will be copied to the location where the user drops the icon.

To provide a user with a better idea of the implications of moving an icon and its underlying file between applications, an operating system may adjust the icon while the user hovers the icon over a destination application. The adjustment may include changing the icon to display a representation of what the destination application would display if the user were to drop the icon into the destination application. As an example, a user may move an icon that corresponds to a photo into a photo editor. The user drags the icon into the photo editor application. As the icon crosses the graphical boundary of the screen where the photo editor is displayed, the operating system transforms the icon to display the content of an image of the underlying photo. The user is still able to move the icon as the user normally would during a dragging operation. In this instance, the user is able to view the implications of dropping the icon into the photo editor before actually dropping the icon into the photo editor.

Previewing the implications of a drag and drop operation may be helpful in instances where it may not be obvious to the user how the icon and its underlying file or files will interact with the destination application. For example, a user may drag an album icon into a photo editor. The album icon may correspond to several music tracks and an album cover image. When the user drags the album icon over the photo editor, the operating system may transform the album icon to display the content of the album cover image. If the user does not want to edit an image of the album cover, then the user may drag the album icon out from the graphical boundary of the photo editor without the photo editor opening the album cover image.

By providing the preview of the implications of the drag and drop operation, the operating system may protect a user's privacy by limiting the applications that have access to the user's files. While a user hovers an icon over a destination application, the destination application may not have access to the underlying file. Instead, the destination application provides instructions to the operating system for rendering the underlying file. Therefore, the user may preview the implications of the drag and drop operation and decide not to drop the icon into the destination application without the destination application loading the underlying file.

According to an innovative aspect of the subject matter described in this application, a method for graphical icon manipulation includes the actions of receiving, through a graphical interface, a user input that corresponds to a selection of a graphical item that is located in a first portion of the graphical interface; while receiving the selection input, receiving, through the graphical interface, a translation input that corresponds to a drag of the graphical item; while receiving the selection input and the translation input, determining that a location of the selection input is in a second portion of the graphical interface; based on determining that the location of the selection input is in the second portion of the graphical interface and while receiving the selection input, updating the graphical item by providing, in place of the graphical item, a representation of a change to the graphical item based on the graphical item being placed in the second portion; determining that the selection input has ceased; and based on determining that the selection input has ceased, providing, for output, the change to the graphical item.

These and other implementations can each optionally include one or more of the following features. The actions further include, based on determining that the selection input has ceased, ceasing to provide, for output, the graphical item without the change to the graphical item. The first portion of the graphical interface corresponds to a first application and the second portion of the graphical interface corresponds to a second, different application. The actions further include, in response to receiving, through the graphical interface, the translation input that corresponds to a drag of the graphical item, accessing an object represented by the graphical item; receiving, from the first application, first instructions for rendering the object while receiving the selection input; and while receiving the selection input and the translation input, rendering the object according to the first instructions.

The actions further include, in response to determining that the location of the selection input is in the second portion of the graphical interface, receiving, from the second application, second instructions for rendering the object while receiving the selection input. The graphical item is updated based on the second instructions. The actions further include determining that the second application is configured to provide multiple changes to the graphical item; and selecting the change to the graphical item from among the multiple changes to the graphical item. The change to the graphical item from among the multiple changes to the graphical item is selected based on user input. The first portion of the graphical interface corresponds to a first section of an application and the second portion of the graphical interface corresponds to a second, different section of the application.

Other embodiments of this aspect include corresponding systems, apparatus, and computer programs recorded on computer storage devices, each configured to perform the operations of the methods.

The subject matter described in this application may have one or more of the following advantages. The system may be able to provide a user a preview of what will occur if the user drops an icon into an application without the user actually dropping the icon into the application. By providing a preview, the user may not have to perform an undo operation for an undesired drop. Loading content into an application and undo operations may be computationally expensive and use additional computing resources. Instead, the user can view the icon change and decide whether to drop the icon. The system may limit the access that the application has to any data that the icon links to when displaying the preview. Limiting access to the data may protect a user's privacy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1E and 2A-2F illustrate example interfaces of graphical icon manipulation.

In the drawings, like reference numbers represent corresponding parts throughout.

DETAILED DESCRIPTION

Figure 1B:
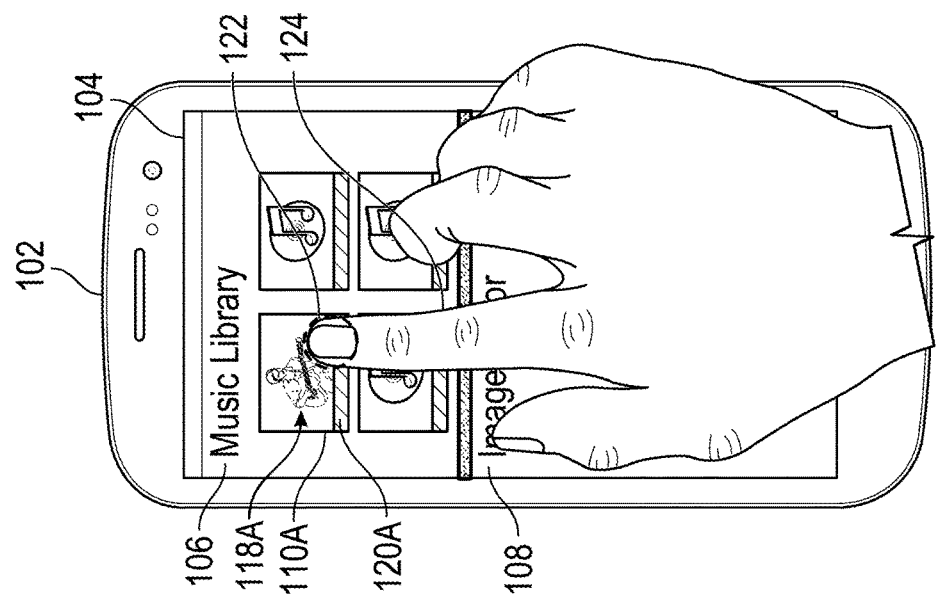

FIGS. 1A-1E illustrate example interfaces of graphical icon manipulation. Briefly, and as described in more detail below, the user selects an icon 110 on a GUI of a mobile device 102 having a touchscreen display 104. The icon 110 links to structured data that can be interpreted in one or more ways by one or more applications. A user selects icon 110 located within a source application 106, and a temporary icon is created that may link to the selected icon 110 and have an appearance matching the selected icon 110. If the user drags this temporary icon into a destination application 108, the temporary icon changes appearances based on the data that is linked to the selected icon 110 and that the destination application 108 recognizes. The user drops the temporary icon into the destination application 108, and a new image or icon is created in the destination application 108 that links to a copy of some, or all, of the data that selected icon 110 links to. In this and other examples, icon may refer to an image or graphical representation of an object or an idea. An icon may also refer to more complex widgetry, such as a music album that consists of multiple views, text widgets, or any similar widgets.

Figure 1A:
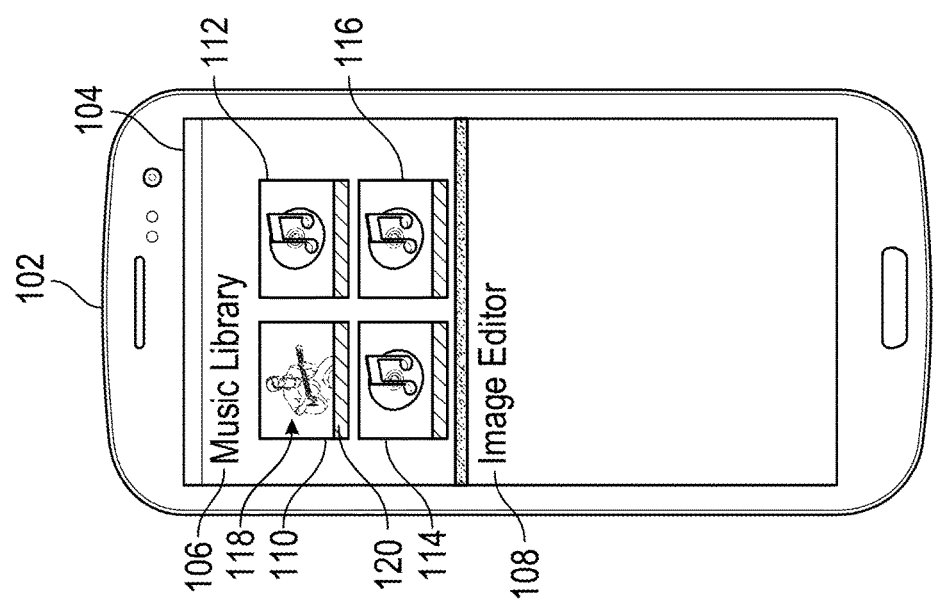

FIG. 1A shows an example mobile device 102 having a touchscreen display 104 displaying a GUI. In the example of FIG. 1A, the mobile device 102 runs two or more applications, displaying at least two of these applications, source application 106 and destination application 108, simultaneously on the GUI of the touchscreen display 104 in a split-screen layout. Although the displayed GUI is illustrated on the touchscreen display 104 of a mobile device 102, it may be viewed on any computing device, with or without a touchscreen display, configured to display two or more applications.

In the example of FIG. 1A, the source application 106 is a music library application containing a number of selectable icons 110, 112, 114, and 116. In particular, icons 110, 112, 114, and 116 represent music albums and link to various types of data including, for example, image data and music data. In this example, the image data is a representation of the respective album's cover and the music data is the one or more songs on the respective album.

Icon 110 represents an album and includes an album layout, which includes a picture area 118, and a caption area 120. The picture area 118 displays image data, such as, for example, the cover of the respective album. The caption area 120 may be left blank or may display information related to the respective album, such as, for example, the name of the respective album, the name of the band or musician who made the respective album, or the name of one or more of the songs on the respective album. In the example of FIG. 1A, due to constraints on the size and dimensions of icon 110 and the corresponding constraints on the picture area 118, the picture area 118 might display a portion of the album cover.

As shown in FIG. 1A, icons 110, 112, 114, and 116 are visually represented on the touchscreen display 104 within the display area of the source application 106. In the example of FIG. 1A, the icons 110, 112, 114, and 116 area similar size and dimension. Icons within a displayed application, e.g., icons 110, 112, 114, and 116, may be of a relative or fixed size and dimension. In some implementations, the size of the icons may depend on the number of other icons displayed in the respective application, such that the more icons displayed in a given application, the smaller the size of each of the icons. For example, if the source application 106 displayed one icon, then that one icon may take up most of the display area of the source application 106, as compared with icons 110, 112, 114, and 116 which each take up about a quarter of the display area of the source application 106. Similarly, the size of the icons may also, or alternatively, depend on the size of the display area allocated to the respective application, e.g., the source application 106, in which the icons are found. The display area of a given application may be larger or smaller due to a number of reasons, including, for example, the number of applications in a split-screen mode, the size of the display screen of the computing device, and a user resizing the display area of that specific application.

In the example of FIG. 1A, the destination application 108 is an image editor application and contains no icons. In some implementations, the destination application 108 may already contain one or more icons similar to icons 110, 112, 114, and 116 in the source application 106. Because the destination application 108 is an image editor, these icons may link to image data instead of another type data.

FIG. 1B shows a user of the mobile device 102 submitting a touch input 122, using a finger 124, on the touchscreen display 104. The touch input 122 selects icon 110 in the source application 106. In some implementations, the touch input 122 is made by a user touching the touchscreen display 104 with a stylus instead of a finger 124. Alternatively, a user can select the icon 110 without a touch input 122 by placing a cursor over the icon or highlighting the icon through use of a keypad, and clicking on a button. For example, a user can move a cursor over an icon 110 with a mouse and click the left mouse button to select the icon.

The selection of icon 110 through the user's touch input 122 creates a conceptual icon 110A which links to the icon 110. As shown in FIG. 1B, the conceptual icon 110A has an album layout with a picture area 118A, displaying the same image data that was displayed in the picture area 118 of selected icon 110 as shown in FIG. 1A, and a caption area 120A, which may be left blank or may display that same data that was displayed in the caption area 120 of selected icon 110 as shown in FIG. 1A. Therefore, in the example of FIG. 1B, the conceptual icon 110A has an appearance matching that of the selected icon 110 as shown in FIG. 1A. In some implementations, the conceptual icon 110A may be emphasized once created. For example, the conceptual icon 110A may be highlighted with a border surrounding it, or other portions within the display area of the source application 106, other than the conceptual icon 110A, may be dimmed. In some implementations, icon 110 may remain on the display 104 as the user moves the conceptual icon 110a around the area of the source application 106.

Figure 1D:
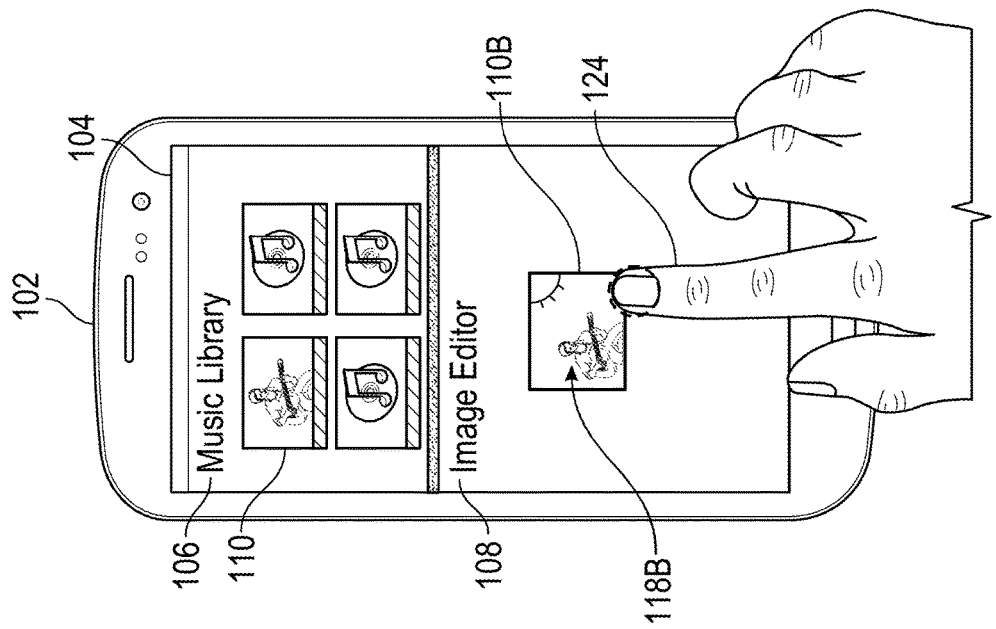
Figure 1C:
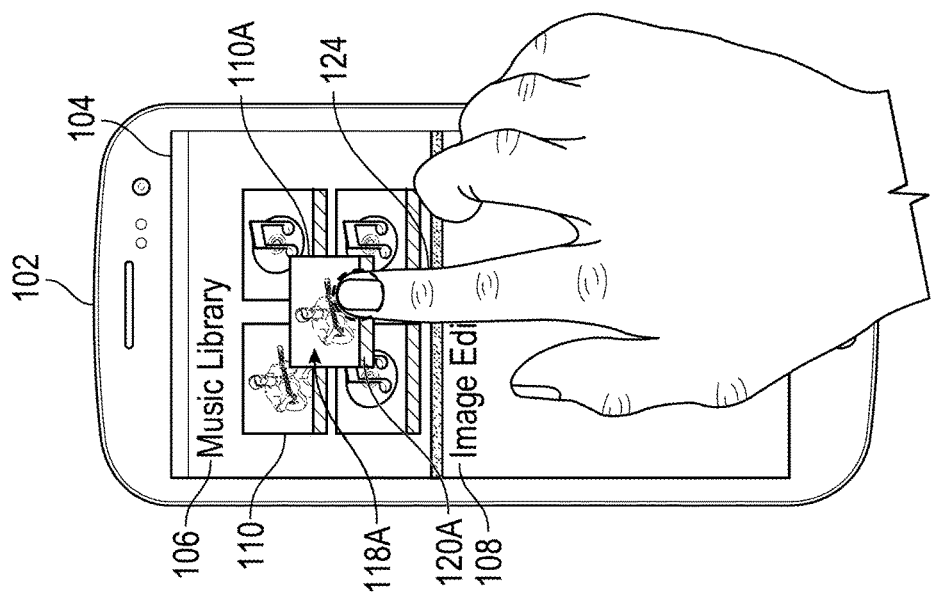

FIG. 1C shows the user having started a dragging motion on the conceptual icon 110A. The user may be dragging the conceptual icon towards the destination application 108. The user performs this dragging motion by maintaining contact with the touchscreen display 104 from the time the user performed the touch input 122, and moving the user's finger 124 from the point where the user performed the touch input to a different location. As the user drags the finger 124 across the touchscreen display 104, the conceptual icon 110A moves with the user's finger 124. In some implementations, this dragging motion is performed by the user using a stylus instead of their finger 124. Alternatively, when a user selects the icon 110, without a touch input 122, the dragging motion can be performed by a user holding down the mouse button clicked to select the icon and moving the mouse or pressing arrow keys to move the created conceptual icon 110A. In some implementations, the conceptual icon 110A may continue to be emphasized, as discussed above, during the dragging motion.

FIG. 1D shows the user having continued the dragging motion of the conceptual icon 1106 into the destination application 108. The conceptual icon 1106 crosses into the bounds of the destination application 108, and the appearance of the conceptual icon 1106 changes. The change in the appearance of the conceptual icon 1106 reflects the data linked to selected icon 110 that the destination application 108 is able to recognize. In this example, because the destination application 108 is an image editor, the destination application 108 is able to recognize image data linked to the selected icon 110. In the example of FIG. 1D, this image data is a representation of the album cover from the music album that selected icon 110 represents.

Once the conceptual icon 1106 crosses into the bounds of the destination application 108, the conceptual icon 1106 changes layouts from an album layout, depicting the appearance of the selected icon 110, to an image layout, depicting the image data linked with the selected icon 110. This change in icon layout corresponds with the removal of the caption area 120A, as shown in FIG. 1C, from the conceptual icon 1106. As such, in this example, the conceptual icon 1106 now has a single area, the picture area 1186. The picture area 1186 is used to display the image data linked to the selected icon 110. In some implementations, the change in appearance of the conceptual icon 1106 may result in a change of the size and/or dimensions of the conceptual icon 1106. In some implementations, the change in appearance of the conceptual icon 1106 may not result in a change of the size or dimensions of the conceptual icon 1106, but does result in the picture area 1186 increasing in size. In such implementations, the increase in size of the picture area 1186 is equal to the size of the previously existing caption area 120A as shown in FIG. 1C. The increased size of the picture area 1186 might enable the icon 1106 to display a larger portion, if not all, of the image data linked to the selected icon 110. For example, a larger portion of album cover is displayed in the picture area 1186 of the conceptual icon 1106 on the touchscreen display 104 as shown in FIG. 1D, as compared with the portion of the album cover displayed in the picture area 118A of the conceptual icon 110A on the touchscreen display 104 as shown in FIG. 1C. The source application 106 may use a cropped version of the album cover in the icon 110, and device 102 may display the full album cover in the conceptual icon 1106.

In some implementations, the conceptual icon 1106 may continue to be emphasized once it is brought into the bounds of the destination application 108. For example, the conceptual icon 1106 may continue to be highlighted with a border surrounding it, or everything other than the conceptual icon 1106 may be dimmed within the display area of the destination application 108. In some implementations, if the conceptual icon 1106 was emphasized by dimming the surrounding display area of the source application 106, once the conceptual icon 1106 is brought within the bounds of the destination application 108, the dimming of the surrounding display area of the source application 106 may end with the dimming of the surrounding display area of the destination application 108 beginning. In some implementations, dimming of the surrounding display area of the source application 106 may end once the conceptual icon 110A, as shown in FIG. 1C, is brought outside the bounds of the source application 106, or substantially outside the bounds of the source application 106.

By changing the display of the conceptual icon from conceptual icon 110A to conceptual icon 110B, device 102 provides the user with a preview of the action that the device 102 may perform if the user were to drop the conceptual icon 110B into the destination application 108B. In the example of FIG. 1D, the device 102 changes the icon 110 that displays a cropped version of a music album cover to a full version of the album cover image as the user drags the icon 110A into the destination application 108B.

Figure 1E:
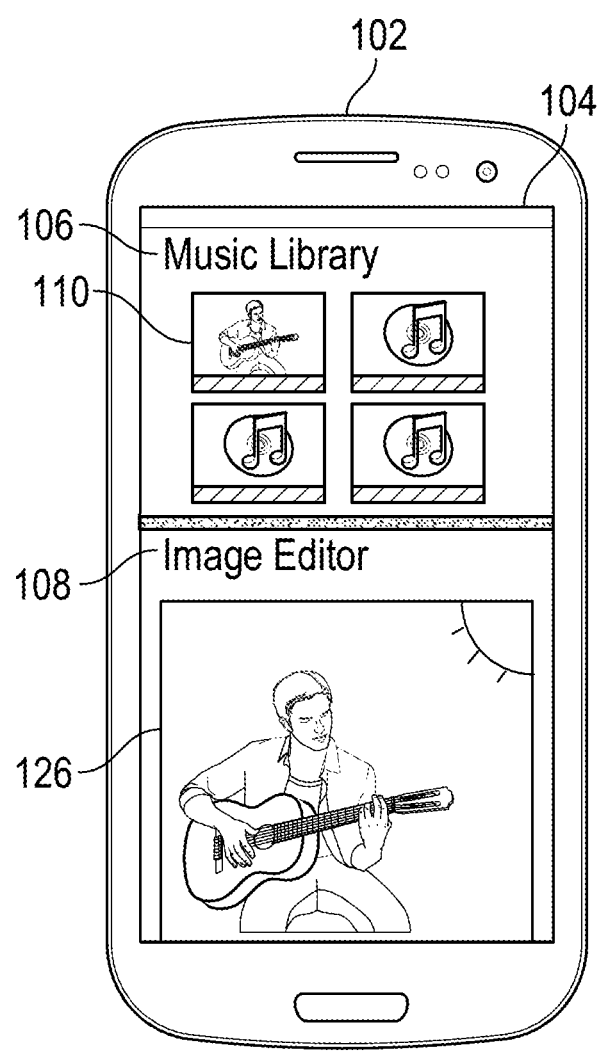

FIG. 1E shows the user having performed a drop operation by ending the dragging motion of the conceptual object 110B, as shown in FIG. 1D, within the bounds of the destination application 108, and having lifted the finger 124 off of the touchscreen display 104. When the user lifts the finger 124 off of the touchscreen display 104, the conceptual icon 110B, as shown in FIG. 1D, is converted into a new image 126 in the destination application 108. In some implementations, the new image 126 can be created by a user lifting a stylus off of the touchscreen display 104 instead of lifting the finger 124. Alternatively, the creation of the new image 126 can be carried out without the use of a touchscreen display by a user letting go of the button that the user clicked to select the icon 110. For example, a user, who had used selected icon 110, with a mouse by clicking the left mouse button, can create the new image 126, by releasing the left mouse button once the conceptual icon 110B has been dragged into the bounds of the destination application 108.

In the example of FIG. 1E, the new image 126 may be a copy of the same image data that was linked with the selected icon 110. In some implementations, the new image 126 has a different size and/or different dimensions than the conceptual icon 110B, as shown in FIG. 1D. The new image 126 may larger than the conceptual icon 110B. In some implementations, the new image 126 automatically fills most of the display area of the destination application 108 upon its creation. In some implementations, the new image 126 may have dimensions proportional to that of the conceptual icon 110B, as shown in FIG. 1D.

In some implementations, where the conceptual icon 1106, as shown in FIG. 1D, is emphasized, the emphasis, whether through highlighting the conceptual icon 1106 or through dimming the surrounding display area of the destination application 108, ends when the conceptual icon 1106 is converted into a new image 126. In some implementations, other icons already exist within the destination application 108, and the creation of the new image 126 may cause the reorganization and/or the resizing of the existing icons. Such reorganization and/or resizing will be discussed in more detail below as it relates to FIG. 2. In some implementations, the number of other icons that already exist within the destination application 108 may determine the size and/or dimensions of the new image 126.

In some implementations, the location of the user's handle on the conceptual icon 110б can help determine what icon layout of the conceptual icon 110б is displayed in the destination application 108. This handle location can also help determine what the new image 126 will be. The handle location on the conceptual icon 110б is determined by the location where the user inputs a touch input 122. In some implementations, the handle location is where the user places a cursor over a selectable icon, e.g., icon 110, and clicks a button. In particular, this feature is employed when the destination application 108 can recognize multiple types of data linked to the selected icon 110. For example, if the selected icon 110 represents an album, and the destination application 108 is a library application capable of organizing both music data, such as songs, and image data, such as pictures, then a determination must be made as to whether the conceptual icon 110б has an image layout, as shown in FIG. 1D, or a music layout, discussed in more detail below as it relates to FIG. 2. Furthermore, a determination has to be made as to whether the new image 126, will link to the music data, where the image 126 is no longer an image, or the image data that selected icon 110 is linked to. The handle location on the conceptual icon 110б can aid in making these determinations.

The conceptual icon 110A may be broken up into different sections, such as a left or right section, or into quadrants. In some implementations, these sections are not created until the conceptual icon 110A crosses into the bounds of the destination application 108 and becomes conceptual icon 110B. In some implementations, the number of data types, linked to the selected icon 110, that the destination application 108 is able to recognize may determine the number of sections that the conceptual icon 110B is broken into. For example, if the destination application 108 is able to recognize two different data types linked to the selected icon 110, such as if the destination application 108 is a library application, then the conceptual icon 110B is broken up into two sections, e.g., a left and right section. Therefore, if the user makes a touch input 122 on the right side of the selected icon 110, this may result in the conceptual icon 110B changing from an album layout, as shown in FIG. 1C, to an image layout, as shown in FIG. 1D, once it is brought within the bounds of the destination application 108. With the handle location on the right side of the conceptual icon 110B, when a user lifts the finger 124 off of the touchscreen display 104, then a new image 126 is created that links to the same image data that the selected icon 110 is linked to.

In a continuation of the example above, if the user instead makes a touch input 122 on the left side of the of the selected icon 110, this may result in the conceptual icon 110B changing from an album layout, as shown in FIG. 1C, to a music layout, discussed below in relation to FIG. 2, once the icon is brought into the bounds of the destination application 108. With the handle location on the left side of the conceptual icon 110B, when a user lifts the finger 124 off of the touchscreen display 104, then one or more new images or data are created that link to the same music data that the selected icon 110 is linked to. In this example, because the selected icon 110 represents an album and likely contains music data for more than one song, once a user, having a handle location on the left side of the conceptual icon 110B, lifts the finger 124 off of the touchscreen display 104, multiple new icons may be created in the destination application 108, each representing an individual song from the album represented by the selected icon 110.

FIGS. 2A-2F illustrate example interfaces of graphical icon manipulation. Briefly, and as described in more detail below, the user selects an icon 210 on a GUI of a mobile device 202 having a touchscreen display 204. The icon 210 links to one or more types of data. A user selects icon 210 located within a source application 206 and a temporary icon is created that links to the selected icon 210 and has an appearance matching the selected icon 210. If the user drags this temporary icon into a destination application 208, the temporary icon changes appearances based off of the type of data linked to the selected icon 210 that the destination application 208 recognizes. The user drags the temporary icon into the icon area of the destination application 208, and the temporary icon may change appearances a second time to depict data linked to the selected icon 210 belonging to the type of data that the destination application 208 recognized. The user drops the temporary icon into the destination application 208, and one or more new icons may be created in the destination application 108 that link to a copy of some, or all, of the data that selected icon 210 links to.

Figure 2B:
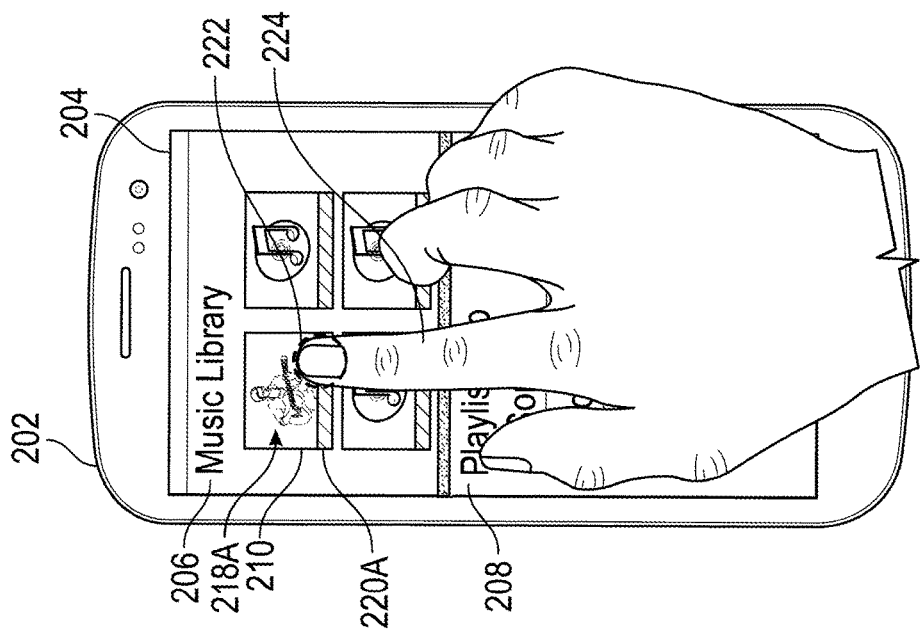
Figure 2A:
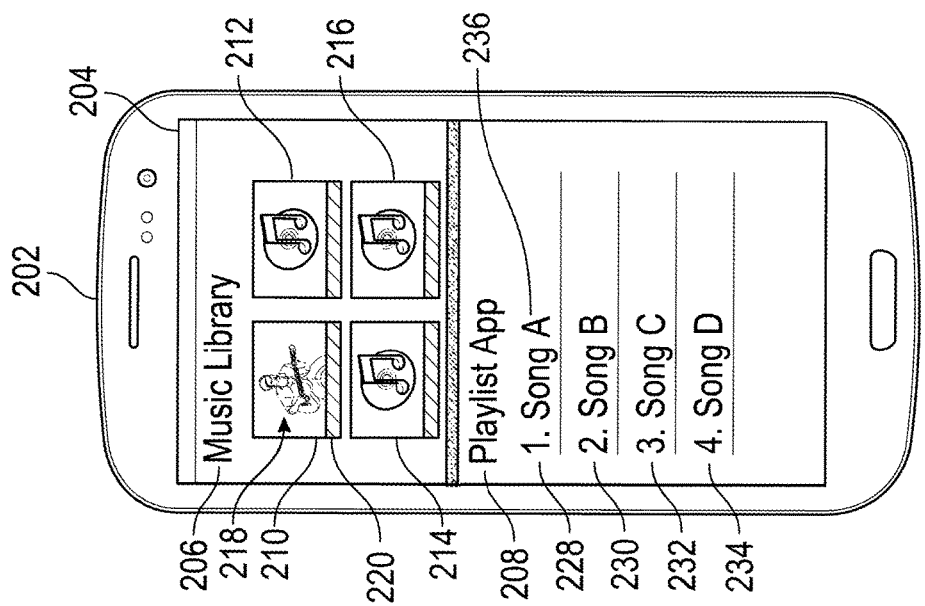

FIG. 2A shows an example mobile device 202 having a touchscreen display 204 similar to that described above in relation to FIG. 1A. The mobile device 202 runs two or more applications, displaying at least two of these applications, source application 206 and destination application 208, simultaneously. Although this example is illustrated on the touchscreen display 204 of a mobile device 202, other examples may be illustrated on any computing device, with or without a touchscreen display, configured to display two or more applications.

In the example of FIG. 2A, the source application 206 is a music library application containing a number of selectable icons 210, 212, 214, and 216. This source application 206 may be similar to the source application 106, as shown in FIG. 1A. In particular, icons 210, 212, 214, and 216 represent music albums and link to various types of data including, for example, image data and music data. In some implementations, the image data is a representation of the respective album's cover and the music data is the one or more songs of the respective album.

Similar to icon 110 discussed above with reference to FIG. 1A, icon 210 represents an album and, thus, has an album layout, which includes a picture area 218 and a caption area 220. The picture area 218 may be similar to the picture area 118, as shown in FIG. 1A. The caption area 220 may be similar to the caption area 120, as shown in FIG. 1A.

As shown in FIG. 2A, icons 210, 212, 214, and 216 are visually represented on the touchscreen display 204 within the display area of the source application 206. Icons 210, 212, 214, and 216 may be similar to icons 110, 112, 114, and 116, as discussed above and shown in FIG. 1A.

In the example of FIG. 2A, the destination application 208 is a playlist application containing icons 228, 230, 232, and 234 arranged vertically in a list. Each of icons 228, 230, 232, and 234 represent a song and link to music data of that respective song. Furthermore, icons 228, 230, 232, and 234 have a song layout that has a textual area, e.g., textual area 236, displaying a song name and a number corresponding to the order of the icon within the list of icons of the destination application 208.

FIG. 2B shows a user of the mobile device 202 providing a touch input 222, using a finger 224, on the touchscreen display 204. The touch input 222 is used to select icon 210 in the source application 206. In some implementations, the touch input 222 is made by a user touching the touchscreen display 204 with a stylus instead of a finger 224. Alternatively, a user can select an icon, e.g. icon 210, without a touch input 222 in a similar manner to that discussed above with reference to FIG. 1B.

The selection of icon 210 through the user's touch input 222 creates a conceptual icon 210A which links to the icon 210. As shown in FIG. 2B, the conceptual icon 210A has an album layout with a picture area 218A, displaying the same image data that was displayed in the picture area 218 of selected icon 210, and a caption area 220A, which may be left blank or may display that same data that was displayed in the caption area 220 of selected icon 210. The conceptual icon 210A may have an appearance matching that of the selected icon 210 as shown in FIG. 2A.

Figure 2D:
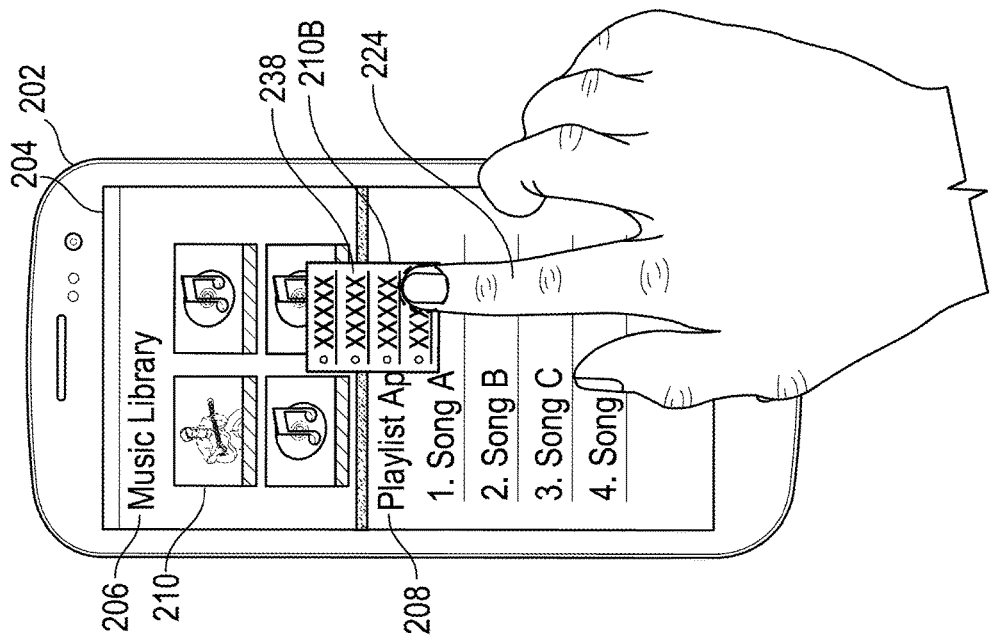
Figure 2C:
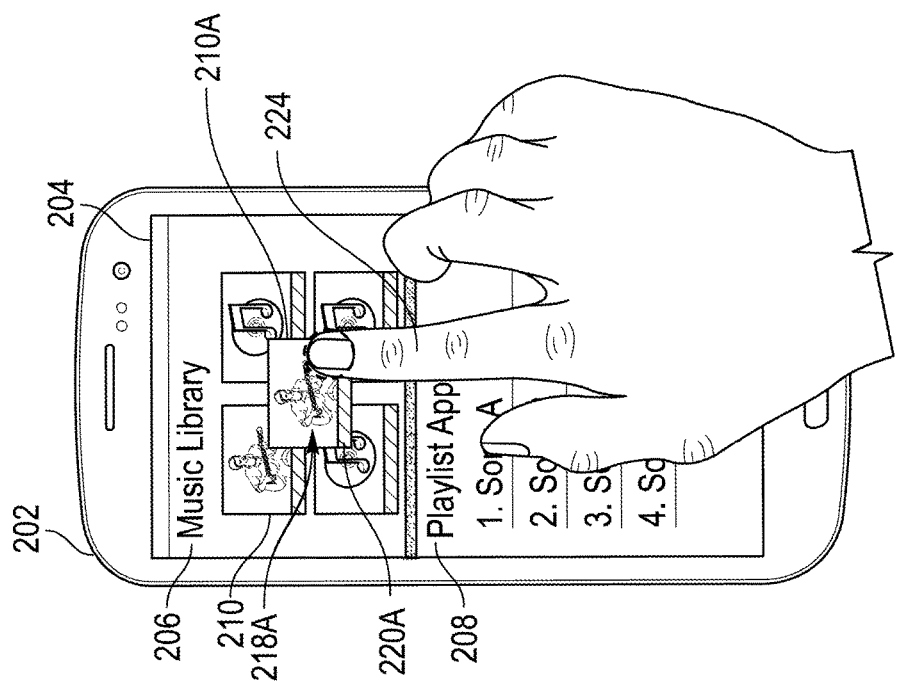

FIG. 2C shows the user having started a dragging motion on the conceptual icon 210A. The user may drag the conceptual icon 210A towards the destination application 108. This dragging motion is performed with the user's finger 224 in a similar manner to that discussed above with reference to FIG. 1C. In some implementations, this dragging motion is performed by the user using a stylus instead of their finger 224. Alternatively, this dragging motion can be performed without a touch input 222 in a similar manner to that discussed above with reference to FIG. 1C.

FIG. 2D shows the user having continued the dragging motion of the conceptual icon 210B into the destination application 208. Upon the conceptual icon 210B crossing into the bounds of the destination application 208, the appearance of the conceptual icon 210B changes. The conceptual icon 210B crosses into the bounds of the destination application 208 when the majority of the conceptual icon 210B crosses into the bounds of the destination application 208, or when the handle location of the conceptual icon 210B, e.g., the location on the icon 210 where the user initiated the touch input 222, crosses into the bounds of the destination application 208. Handle location is discussed in more detail above with reference to FIGS. 1B-1E. In some implementations, the conceptual icon 210B does not change layouts until the icon is brought completely into the bounds of the destination application 208.

In the example of FIG. 2D, the change in the appearance of the conceptual icon 210B, upon crossing into the bounds of the destination application 208, reflects the type of data linked to selected icon 210 that the destination application 208 is able to recognize. In particular, because the destination application 208 is a playlist application, it is able to recognize that the selected icon 210 is linked to music data. Because the playlist application is able to recognize that the selected icon 210 is linked to music data, the conceptual icon 210B changes from an album layout, as shown in FIG. 2C, to a music layout, displaying a visual representation of a song list. The list of songs may be bulleted, as shown in FIG. 2D, or may be numbered. In some implementations, the conceptual icon 210B displays a default image for a general music layout that does not reflect any of the actual data that the selected icon 210 is linked to. This is in contrast to conceptual icon 110B as shown in FIG. 1D, which displays the actual image data that selected icon 110 is linked to. Alternatively, the conceptual icon 210B may depict the actual music data linked to the selected icon 210 and display some, or all of the song names of songs of the respective album represented by selected icon 210 when conceptual icon 210B is brought into the bounds of the destination application 208.

The conceptual icon 210B crosses the bounds of the destination application 208, and the conceptual icon 210B changes layouts from an album layout, depicting the appearance of the selected icon 210, to a music layout, depicting a visual representation of a song list. This change in icon layout corresponds with both the picture area 218A and caption area 220A being replaced with a single song list area 238. In the example of FIG. 2D, the change in appearance of the conceptual icon 210B may result in a change of the size or dimensions of the conceptual icon 210B. As such, the song list area 238 may be larger in size, or smaller in size to the combination of the picture area 218A and caption area 220A, as shown in FIG. 2C. In some implementations, the song list area 238 may be equal in size to the combination of the picture area 218A and caption area 220A, as shown in FIG. 2C. In some implementations, where the conceptual icon 210B incorporates the actual music data linked to the selected icon 210, the size and/or dimensions of the conceptual icon 210B may change, upon being dragged substantially into the bounds of the destination application 208, based on the number of songs within the respective album represented by selected icon 210.

FIG. 2E shows the user having continued the dragging motion of the conceptual icon 210C within the destination application 208. In some implementations, the conceptual icon 210C may change appearances a second time when it is brought in the vicinity of the icons within the destination application 208, e.g. icons 228, 230, 232, and 234 as shown in FIG. 2D. Although the conceptual icon 210C maintains a music layout, its size and proportions may change, and the conceptual icon 210C now depicts the music data linked to the selected icon 210 by displaying some, or all of the song names of songs associated with the respective album represented by the selected icon 210. In some implementations, the conceptual icon 210C has widened to the width of the display area of the destination application 208. In some implementations, where the conceptual icon 210B incorporates the actual music data linked to the selected icon 210, a second change in the conceptual icon, e.g. as illustrated by conceptual icon 210C, might not occur.

The size and/or dimensions of the conceptual icon 210C may depend on the number of songs associated with the respective album represented by selected icon 210. For example, conceptual icon 210C may be larger if there are more songs associated with the respective album, or smaller if there are less songs associated with the respective album. In some implementations, the conceptual icon 210C may display a maximum number of song names of the songs of the respective album. For example, the conceptual icon 210C may be limited to displaying the names of only three songs despite selected icon 210 representing an album having more than three songs. When the conceptual icon 210C does not display all of the song names of the songs of the respective album, the conceptual icon 210C may also include a sign, such as a vertical ellipsis, to signal that the conceptual icon 210C represents more songs than are being displayed.

When the conceptual icon 210C is brought in the vicinity of the icons within the destination application 208, e.g. icons 228, 230, 232, and 234 as shown in FIG. 2D, it is placed in-line with those icons. This may be in contrast to previous manifestations of the conceptual icon, e.g. conceptual icon 210A and 210B as shown in FIG. 2B-2C, which hovered over icons. When the conceptual icon 210C is placed in-line with the icons within the destination application 208, it may force one or more of the icons to change location. In the example of FIG. 2E, icon 234 may be moved out of the display area of the destination application 208, and icon 232 may be relocated near the bottom of the display area of the destination application 208. In addition, as the conceptual icon 210C is brought in the vicinity of the icons within the destination application 208, the upper and lower borders of the conceptual icon 210C may change from a solid line to a dashed line to represent that the conceptual icon 210C has been placed in-line with the icons within the destination application 208. In some implementations, instead of icon 234, as shown in FIG. 2D, being forced out of the display area of the destination application 208, icons 228, 230, 232, and 234 may shrink in size such that they all remain visible within the display area of the destination application 208 despite the conceptual icon 210C being placed in-line with them.

FIG. 2F shows the user having performed a drop operation by ending the dragging motion of the conceptual object 210C within the bounds of the destination application 208, and having lifted the finger 224 off of the touchscreen display 204. The user lifts their finger 224 off of the touchscreen display 204, and the conceptual icon 210C is converted into a three new icons, icon 240 representing "Song X", icon 242 representing "Song Y", and an icon representing "Song Z" that is not currently shown in the display area of the destination application 208. These three icons each represent one of the songs associated with the respective album associated with selected icon 210. In the example of FIG. 2F, the album represented by selected icon 210 contained three songs, where new icons 240, 242, and an icon representing "Song Z" each represent one of these three songs. New icons 240, 242, and an icon representing "Song Z" each have a song layout with a textual area, e.g. textual area 236, that displays the respective song's name and a number corresponding to order of the icon within the list of icons of the destination application 208. In some implementations, new icons 240, 242, and an icon representing "Song Z" can be created by a user lifting a stylus off of the touchscreen display 204 instead of lifting their finger 224. Alternatively, the creation of the new icons 240, 242, and an icon representing "Song Z" can be carried out without the use of a touchscreen display in a similar manner to that discussed above with reference to FIG. 1E.

New icons 240, 242, and an icon representing "Song Z" may be placed in the list of icons within the destination application 208 in an order which corresponds with the in-line location of conceptual icon 210C, as shown in FIG. 2E. In the example of FIG. 2F, the user performed a drop operation on the conceptual object 210C, as shown in FIG. 2E, when the conceptual object 210C was between icon 230 and icon 232. As such, when the user performed the drop operation, new icons 240, 242, and an icon representing "Song Z" were placed in the icon list of the destination application 208 below icon 230 and above icon 232. In some implementations, any icons within the destination application 208 that were forced out of the display area of the destination application 208 by the conceptual icon 210C, as shown in FIG. 2E, may continue to not be displayed upon the creation of the new icons 240, 242, and an icon representing "Song Z". Furthermore, in the example of FIG. 2F, not all of the new icons may be displayed. For example, in some implementations, the destination application 208 may have a maximum number of icons it can display within its display area, such as four icons. In this example, because the icon representing "Song Z" would be the fifth icon, it is moved out of the display area of the destination application 208 along with icons 232 and 234. In some implementations, if the in-line placement of the conceptual icon 210C, and/or the creation of new icons 240, 242, and an icon representing "Song Z" results in any icons within the destination application being moved out of the display area of the destination application 208, then a sign icon 246, such as a vertical ellipsis, might be displayed to relay that some icons have been omitted from display. In some implementations, the sign icon 246 might be selectable. Where the sign icon 246 is selectable and if a user clicks on the sign icon, the icons within the destination application 208 that were not previously displayed will now be displayed within the display area of the destination application 208.

In the example of FIG. 2F, the new icons 240, 242, and an icon representing "Song Z" each represent a song and link to a copy of a portion of the music data that was linked with the selected icon 210. In some implementations, the new icons 240, 242, and an icon representing "Song Z" collectively have a different size and/or have different dimensions than the conceptual icon 210C, as shown in FIG. 2E. In some implementations, the collective size of the new icons 240, 242, and an icon representing "Song Z" may have collective size and dimensions similar to the conceptual icon 210C, as shown in FIG. 2E. However, in an implementation where new icons 240, 242, and an icon representing "Song Z" are collectively larger or smaller than conceptual icon 210C, as shown in FIG. 2E may depend on the number of icons already existing within the destination application 208. For example, if no icons existed in the destination application 208 prior to the creation of new icons 240, 242, and an icon representing "Song Z", then new icons 240, 242, and an icon representing "Song Z" may have a collective size larger than conceptual icon 210C, as shown in FIG. 2E, in order to attempt to fill the empty space of the destination application 208. However, if one or more icons already exist within the destination application 208, e.g., icons 228, 230, 232, and 234 as shown in FIG. 2A, prior to the creation of new icons 240, 242, and an icon representing "Song Z", then new icons 240, 242, and an icon representing "Song Z" may have a collective size smaller than conceptual icon 210C, as shown in FIG. 2E, in order to attempt to have all the icons, within the destination application 208, be displayed.

In some implementations, the conceptual icons 210A, 210B, or 210C may be highlighted when each is created, when each is dragged within the source application 206, when each is substantially dragged into the destination application 208, and/or when each is placed in-line with icons within the destination application 208. Highlighting of the conceptual icons 210A, 210B, or 210C may be completed in a manner similar to that of the conceptual icons 110A and 110B discussed above with reference to FIGS. 1B-1D.

Figure 3:
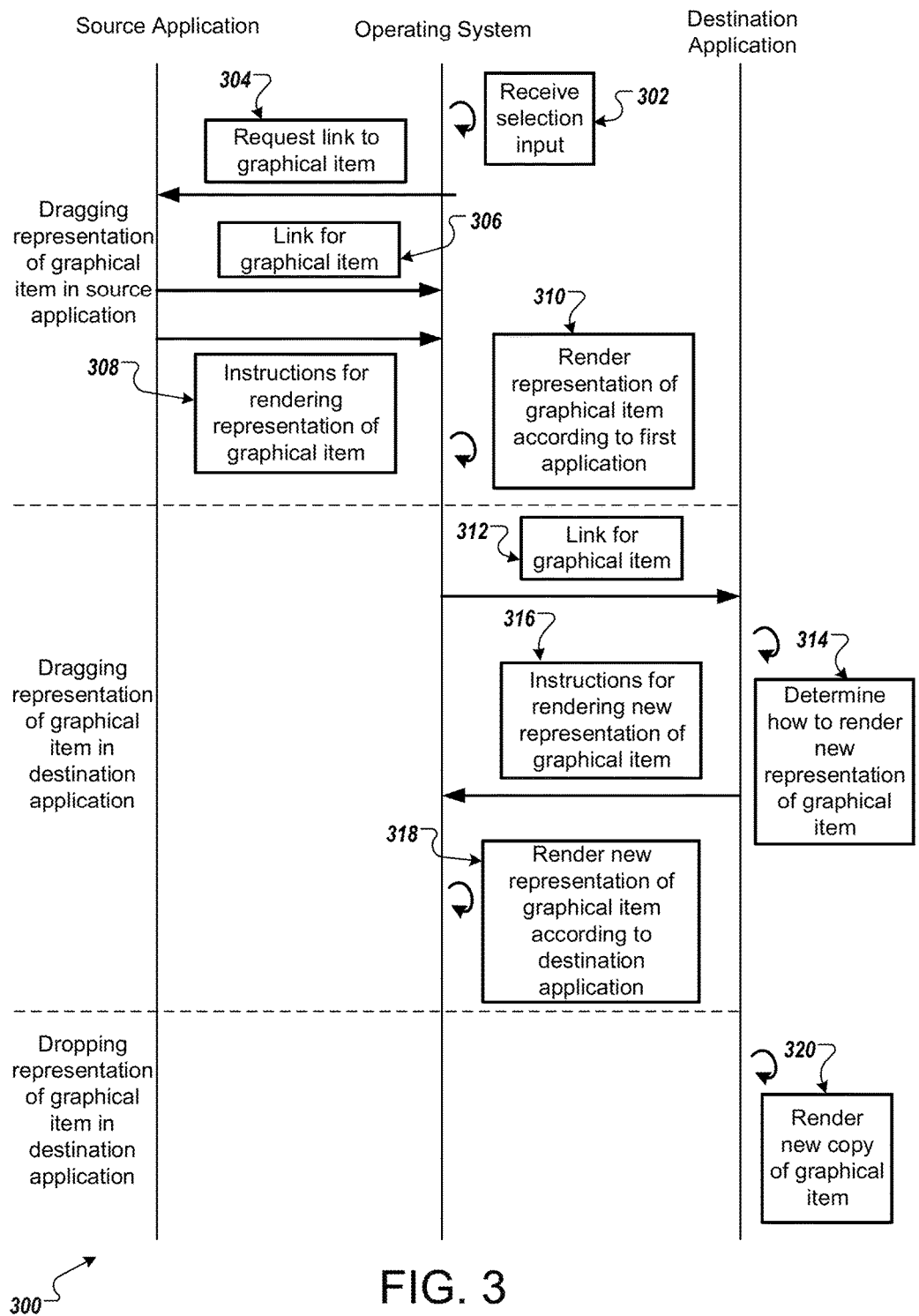
FIG. 3 illustrates a swim lane diagram of graphical icon manipulation.

FIG. 3 illustrates a swim lane diagram 300 of graphical icon manipulation. In general, the swim lane diagram 300 illustrates an example process by which a source application and a destination application communicate with the operating system of a mobile device, or other computing device. This process involves a user selecting a graphical item, dragging a representation of the graphical item within the source application, dragging the representation of the graphical item into the destination application, and dropping the representation of the graphical item within the destination application. This process will be explained with frequent references to FIGS. 1A-1E, and FIGS. 2A-2F.

In the example of FIG. 3, the process illustrated in the swim lane diagram 300 may be implemented using a computer-readable storage medium having program code for use by or in connection with a mobile device, computing device, or any instruction execution system. Furthermore, this process can be implemented in the example screen shots of FIGS. 1A-1E, and FIGS. 2A-2F. For example, as depicted in FIG. 3, "Source Application" may refer to source application 106 as shown in FIG. 1A or source application 206 as shown in FIG. 2A; "Destination Application" may refer to destination application 108 as shown in FIG. 1A, or destination application 208 as shown in FIG. 2A; "Operating System" may refer to the operating system of a mobile device, such as mobile device 102 as shown in FIG. 1A, or mobile device 202 as shown in FIG. 2A; "graphical item" may refer to icon 110 as shown in FIG. 1A, or icon 210 as shown in FIG. 2A; and "representation of graphical item" may refer to conceptual icon 110A and 110B as shown in FIGS. 1A-1D, or conceptual icon 210A, 210B, or 210C as shown in FIGS. 2A-2E.

The process illustrated by the swim lane diagram 300 may begin with stage 302, where the operating system of a mobile device, e.g. mobile device 102 as shown in FIG. 1A, receives a selection input made by a user. A user can make a selection input in a number of ways, such as through a touch input, e.g., touch input 122 as shown in FIG. 1B, with a finger, e.g. finger 124 as shown in FIG. 1B, or with a stylus. A user can also make a selection input without a touch input as discussed in more detail above with reference to FIG. 1B. The selection input is made on a graphical item within the source application, e.g., icon 110 as shown in FIG. 1A. The operating system receives the selection input and indicates to the source application that the user has performed a gesture on the source application at a particular location and requests a link to the selected graphical item (304).

In response to the operating system's request for a link to the graphical item (304), the source application sends the operating system a link to the graphical item located where the user performed a selection input (306). Along with sending a link to the graphical item to the operating system, the source application also sends the operating system instructions for rendering a representation of the graphical item (308). The operating system receives the link for the graphical item and the instructions for rendering a representation of it and renders a representation of the graphical item according to the instructions from the source application (310). In some implementations, the operating system may also render an emphasis of the representation of the graphical item. Emphasis of a representation of a graphical item, e.g., conceptual icon 110A as shown in FIG. 1C, is discussed in more detail above with reference to FIGS. 1B-1D.

In some implementations, the source application may perform the rendering of the representation of the graphical item. In some implementations, the operating system, upon receiving the link for the graphical item, may send the link to a lookup system to find an application to help render a representation of the graphical item. In such a scenario, the lookup system is likely to select the source application as the application to help render a representation of the graphical item. In some implementations, where the operating system natively recognizes how to render a representation of the graphical item, the operating system may handle the rendering of the representation of the graphical item without sending the link to the graphical item to a lookup system, and/or using instructions for rendering a representation of the graphical item sent to the operating system by the source application.

Through stages 302-310 of the process illustrated by the swim lane diagram 300, the GUI of the mobile device may undergo some changes. Examples of these potential changes are provided by FIGS. 1A-1C and FIGS. 2A-2C, where upon the selection of the graphical item, e.g., icon 110 as shown in FIG. 1A, a representation of the graphical item, e.g., conceptual icon 110A as shown in FIG. 1B, is created which can be manipulated by the user within and outside the bounds of the source application, e.g., source application 106 as shown in FIG. 1A.

The user drags the representation of the graphical item into the bounds, or substantially into the bounds of the destination application, and a link for the graphical item is sent to the destination application, e.g., destination application 108 as shown in FIG. 1A. Dragging a representation of a graphical item, e.g., conceptual icon 210B, substantially into the bounds of a destination application, e.g., destination application 208, is discussed in more detail above with reference to FIG. 2C. Upon receiving the link for the graphical item from the operating system (312), the destination application determines how to render a new representation of the graphical item (314). The destination application makes this determination by identifying what types of data linked to the graphical item that it recognizes. Based off of this recognition, the destination application sends instructions for rendering a new representation of the graphical item to the operating system (316). Upon receiving the instructions for rendering a new representation of it, the operating system renders a new representation of the graphical item, e.g. conceptual icon 110B as shown in FIG. 1B, according to the source application, e.g., source application 106 as shown in FIG. 1A (318). In some implementations, the operating system may also aid in providing an animation between the rendering of a representation of the graphical item and the rendering of a new representation of the graphical item. In some implementations, the operating system may also continue to render an emphasis of the representation of the graphical item, e.g., conceptual icon 110B as shown in FIG. 1D, discussed in more detail above with reference to FIGS. 1B-1D.

In some implementations, the operating system provides the destination application a different link to the graphical item in stage 312 than the link to the graphical item that the operating system receives in stage 306. The operating system may provide a link to the graphical item that is designed to protect the underlying data while also providing the destination application with enough information to determine how to render the graphical item. The operating system limiting the exposure of the underlying data may protect the file from unnecessary exposure to an additional application and protect a user's privacy by limiting the applications that have access to the underlying data.

In some implementations, the destination application may perform the rendering of the new representation of the graphical item. In some implementations, where the destination application does not recognize the type of data linked to the graphical item, the destination application may indicate to the operating system that it does not know how to render the new representation of the graphical item. The destination application might make this indication by not providing the operating system any instructions for rendering the graphical item, by requesting that the operating system perform a lookup, and/or providing the operating system instructions to perform a lookup. During lookup, the operating system may send the link of the graphical item to a lookup system to find an application to help render a new representation of the graphical item. In such a scenario, the lookup system may continue to use the source application as the application to help render a new representation of the graphical item. In some implementations, where the operating system natively recognizes how to render a representation of the graphical item, it may handle the rendering of the new representation of the graphical item itself without sending the link to the graphical item to a lookup system. In some implementations, where the destination application does not recognize the type of data linked to the graphical item, the operating system may render a default graphical image for the new representation of the graphical item to indicate that the destination application does not recognize how to render a representation of the graphical item and that the representation of the graphical item cannot be dropped within the bounds of the destination application.

Through stages 312-318 of the process illustrated by the swim lane diagram 300, the GUI of the mobile device may undergo some changes. Examples of these potential changes are provided by FIGS. 1C-1D and FIGS. 2C-2E, where upon the dragging of the representation of the graphical item, e.g., conceptual icon 110A as shown in FIG. 1C, into the bounds of the destination application, the representation of the graphical item changes, e.g., conceptual icon 110B as shown in FIG. 1D.

In stage 320, the destination application renders a new copy of all, or a portion of the graphical item upon the user dropping the new representation of the graphical item within the bounds of the destination application. As discussed with reference to FIGS. 1E and 2F above, a user drops a representation of a graphical item, e.g., conceptual icon 110B as shown in FIG. 1D, by ending their selection input, e.g., touch input 122 as shown in FIG. 1B, by lifting their finger or stylus off of the touchscreen display of a mobile device, or letting go of the key they clicked to select the graphical item. As shown in the examples of FIGS. 1E and 2F above, the new copy of the graphical item may look similar to that of the new representation of the graphical item. The creation of a new copy of the graphical item may also create a copy of all, or a portion of the data that the graphical item was linked to. In some implementations, only the data belonging to the types of data that the destination application recognized from the graphical item is copied. The new copy of the graphical item links to the new copy of the data.

In some implementations, where the destination application does not recognize the types of data linked to the graphical item, the user may be prevented from dropping the new representation of the graphical item within the bounds of the destination application. A user attempting to perform a drop operation on the new representation of the graphical item within the bounds of the destination application by ending their selection input may result in no new copy of the graphical item being created. In some implementations, where a user attempts to perform such a drop operation, the representation of the graphical item may disappear as the operating system will cease to render it. In such a scenario, a user may perform a new selection input on the graphical item to recreate the representation of the graphical item.

Through stage 320 of the process illustrated by the swim lane diagram 300, the GUI of the mobile device may undergoes some changes. Examples of these potential changes are provided by FIGS. 1D-1E and FIGS. 2E-2F, where upon the dropping of the representation of the graphical item, e.g., conceptual icon 110B as shown in FIG. 1D, within the bounds of the destination application, a new icon, e.g., image 126 as shown in FIG. 1E, is created.

Figure 4:
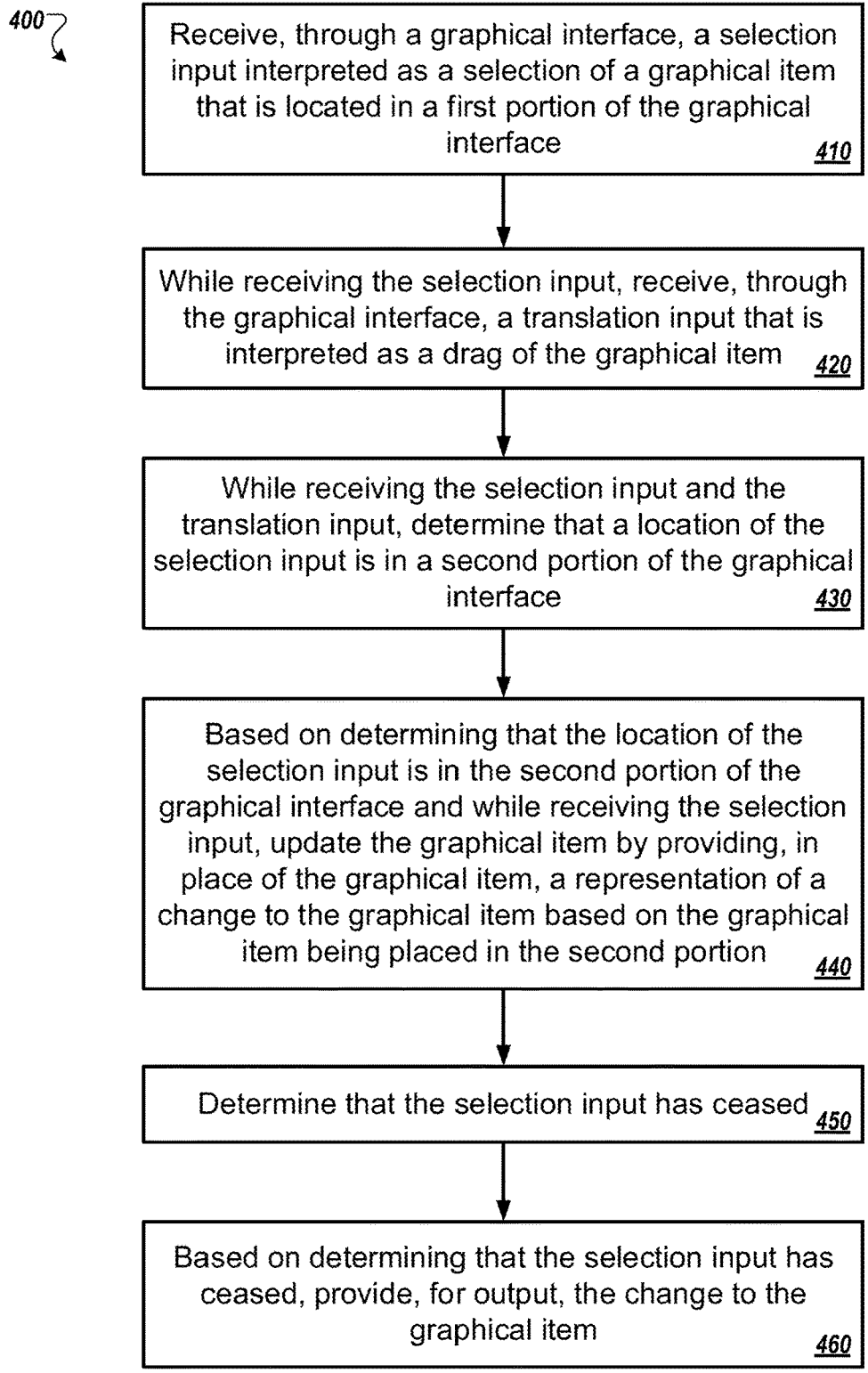
FIG. 4 illustrates an example process for graphical icon manipulation.

FIG. 4 illustrates an example process 400 for graphical icon manipulation. In general, the process 400 receives, from a user, a drag input of a graphical item that is displayed on a graphical interface. The user drags the graphical item to a different portion of the graphical interface, and the process 400 updates the graphical item to show the change that the graphical item will cause to the different portion of the graphical interface if the user dropped the graphical item in the different portion. The process 400 will be described as being performed by a computer system comprising one or more computers, for example, computing device 100 as shown in FIG. 1 or computing device 200 as shown in FIG. 2.

The system receives, through a graphical interface, a selection input interpreted as a selection of a graphical item that is located in a first portion of the graphical interface (410). In some implementations, the graphical is an icon that represents a file such as a photo, a song, an album, a playlist, a text file, a spreadsheet file, etc. In some implementations, the selection input is a touch input on a touchscreen display. In some implementations, the selection input is a mouse click. In some implementations, the selection input is a voice input. For example, a user may speak, "select and being dragging the rock album." In some implementations, the selection input is a toggle input, such as in a virtual reality based pointing-style user interface. For example, a user may select multiple photos in a photo organization application. This group of photos may be able to be dragged collectively through a selection input that is a toggle rather than a continuous input. In some implementations, the first portion of the graphical interface is an application, e.g., a window of a music application. In some implementations, the first portion of the graphical interface is a file browser. In some implementations, the first portion of the graphical interface is a specific area of an application. For example, the first portion is list of images in a photo editor application.

The system, while receiving the selection input, receives, through the graphical interface, a translation input that is interpreted as a drag of the graphical item (420). For example, the user moves the user's finger across the display while maintain contact with the display. As another example, the user moves the mouse cursor across the graphical interface while maintaining the mouse in a clicked state. These actions move the graphical item across the graphical interface.

The system, while receiving the selection input and the translation input, determines that a location of the selection input is in a second portion of the graphical interface (430). In some implementations, the second portion of the graphical interface is a second application that is different than the application where the graphical item was originally located. In some implementations, the second portion corresponds to a different section of an application. For example, the application may be a photo editor with a list of images in the margin and a primary photo editing space in the center of the photo editor. The margin may be the first portion and the primary photo editing space may be the second portion.

In some implementations, the system receives, from an application that corresponds to the first portion, instructions for rendering the graphical item. The system may use the instructions to render the graphical item while the user drags the graphical item around the first portion of the graphical interface. For example, a user may select a playlist icon from a file from a file browser window. While the user drags the playlist icon around the file browser, the system may render the playlist icon according to instructions from the file browser. In some implementations, the instructions may be to render the graphical item as the graphical item appears in the first portion. With the playlist example, the system may render the playlist icon as the playlist icon appeared in the first portion before the user selected the playlist icon. In this case, the user appears to be moving the playlist icon around the graphical interface while dragging the playlist icon.

The system, based on determining that the location of the selection input is in the second portion of the graphical interface and while receiving the selection input, updates the graphical item by providing, in place of the graphical item, a representation of a change to the graphical item based on the graphical item being placed in the second portion (440). In some implementations, the system receives from an application of the second portion, instructions for rendering the graphical item when the graphical item crosses into the second portion. The application may receive an object that the graphical item points to, and the application may provide instructions to render that object. Alternatively or additionally, the application may receive a link, reference, or pointer to the object. The rendering corresponds to how the object will appear in the second portion when the user stops providing the selection input. For example, the user may select an album from a file browser. The album may be represented by an icon of a music note. The user drags the album icon into a photo editor. The album icon crosses the boundary of the photo editor and the photo editor provides instructions for rendering the album icon. The instructions correspond to what the photo editor will show if the user dropped the album icon into the photo editor. In this instance, the photo editor may show the album cover. Therefore, the system changes the icon to the album cover based on instructions provided by the photo editor. This allows the user to preview what will happen to the album icon if the user drops the album icon into the photo editor.

In some implementations, the receiving application of the second portion may be able to display the graphical item in more than one way. For example, the album icon may link to an album with a track list and an album cover. The user may drag the album icon to a presentation application. The user drags the album icon across the boundary of the presentation application. The presentation application analyzes the data that the album icon links to. The data includes the track list, the music files, and the album cover. The presentation application determines that it is capable of displaying the track list or the album cover if the user were to drop the album icon into the presentation application. In one instance, the presentation application may notify the system that the presentation application and that the presentation application may render the album icon in two different ways. The system may present the two different ways to the user, and the user may select one. If the user selects the track list, then the system changes the album icon to a representation of a track list while the user hovers the album icon over the presentation application. If the user selects the album cover, then the system changes the album icon to a representation of the album cover art while the user hovers the album icon over the presentation application.

In another instance, the presentation application may select how to render the album icon. The presentation application may select the option based on the capabilities and features of the presentation application. The presentation application may be more commonly used to display images rather than text. In this instance, the presentation application may provide instructions to the system to render the album icon as the album cover. In some implementations, the presentation application may provide the option of rendering the album icon as the album cover or as the track list. The system may make the selection based on the characteristics of the presentation application. The system may also make the selection based on the load on the system. For example, the system may use less computing resources, e.g. memory or processing capability or both, to render a representation of the track list rather than the album cover art. In this instance, the system may select the track list rendering option.

The system determines that the selection input has ceased (450). In this instance, the user has dropped the graphical icon into the second portion. For example, the user may drop the album icon into the presentation application or into the photo editor.

The system, based on determining that the selection input has ceased, provides, for output, the change to the graphical item (460). For example, the photo editor application may open the album cover art for editing. The album cover art may be a separate file from the one used to display the album cover in the icon. As another example, the presentation application may display an editable copy of the list of tracks in the album. The presentation application may alternatively display an editable copy of the album cover art. In instances where the receiving application is configured to display different representations of the icon, the receiving application may display the representation that corresponds to how the icon changed when the icon crossed the boundary of the receiving application. In some implementations, the receiving application may prompt the user for how the receiving application should display the underlying data.

In some implementations, the receiving application may not cause a visual change to the graphical item when the item is dropped into the receiving application. In an example where the receiving application is a music player application, the music player application may play an audio file that a user drops into the music player. In this instance, the user may hover an icon that represents the audio file over the music player application. The icon that represents the audio file may transform to a music note icon to indicate to the user that the music player application will play the audio file. the icon may be animated to indicate music playing. Alternatively or additionally, the system may output, through a speaker, a portion of the audio file while the user hovers the icon over the music playing application. Instead of a portion of the audio file, the outputted audio may be a generic audio file. By playing a generic audio file, the music player application may not have access to the underlying audio file while still providing an indication to the user that the music player application will play the audio file if the user drops the icon.

Figure 5:
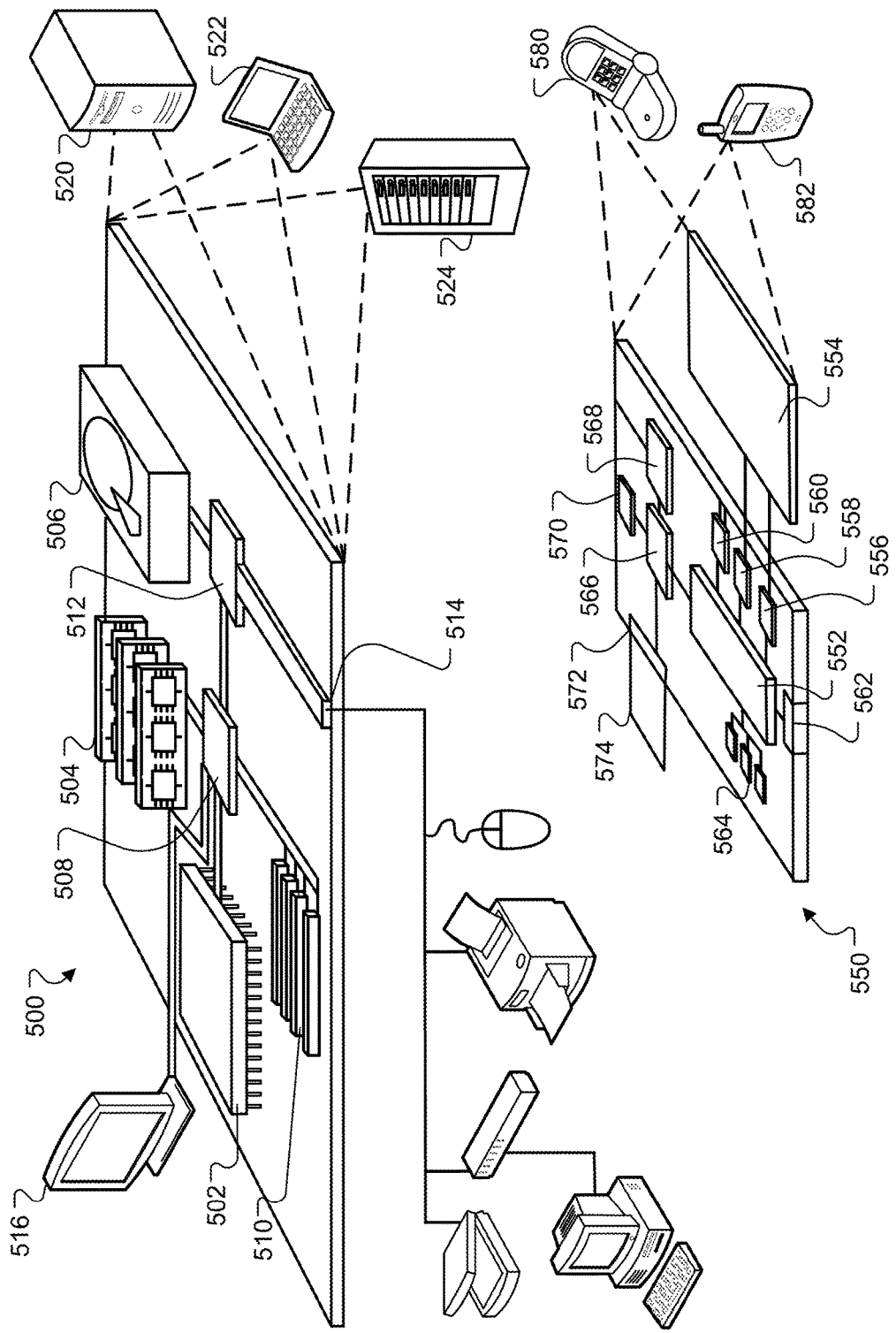
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, through a graphical interface on a mobile device, a user input that corresponds to a selection of a graphical item that is located in a first portion of the graphical interface and that represents a collection of media files;
   while receiving the selection input, receiving, through the graphical interface, a translation input that corresponds to a drag of the graphical item that represents the collection of media files;
   while receiving the selection input and the translation input, determining that a location of the selection input is in a second portion of the graphical interface that includes a representation of a playlist;
   based on determining that the location of the selection input is in the second portion of the graphical interface that includes the representation of the playlist and while receiving the selection input:

determining that, if the selection input ceased while the location of the selection input is in the second portion of the graphical interface that includes the representation of the playlist, that a representation of each media file in the collection of media files would be displayed in the representation of the playlist and would each be user-selectable; and updating the graphical item that represents the collection of media files by providing, in place of the graphical item, the representation of each media file in the collection of media files;

determining that the selection input has ceased; and based on determining that the selection input has ceased, providing, for display in the representation of the playlist, the representation of each media file in the collection of media files, wherein each representation of each media file is user-selectable.

2. The method of claim 1, wherein the first portion of the graphical interface corresponds to a first application and the second portion of the graphical interface that includes the representation of the playlist corresponds to a second, different application.

3. The method of claim 2, comprising:

in response to receiving, through the graphical interface, the translation input that corresponds to a drag of the graphical item, accessing an object represented by the graphical item;

receiving, from the first application, first instructions for rendering the object while receiving the selection input; and while receiving the selection input and the translation input, rendering the object according to the first instructions.

4. The method of claim 2, comprising:

in response to determining that the location of the selection input is in the second portion of the graphical interface that includes the representation of the playlist, receiving, from the second application, second instructions for rendering the object while receiving the selection input, wherein determining that, if the selection input ceased while the location of the selection input is in the second portion of the graphical interface that includes the representation of the playlist, that the representation of each media file in the collection of media files would be displayed in the representation of the playlist and would each be user-selectable is based on the second instructions.

5. The method of claim 2, comprising:

determining that the second application is configured to provide multiple changes to the graphical item, wherein determining that, if the selection input ceased while the location of the selection input is in the second portion of the graphical interface that includes the representation of the playlist, that the representation of each media file in the collection of media files would be displayed in the representation of the playlist and would each be user-selectable comprises selecting the change to the graphical item from among the multiple changes to the graphical item.

6. The method of claim 5, wherein the change to the graphical item from among the multiple changes to the graphical item is selected based on user input.

7. The method of claim 1, wherein the first portion of the graphical interface corresponds to a first section of an application and the second portion of the graphical interface that includes the representation of the playlist corresponds to a second, different section of the application.

8. A system comprising:

one or more computers and one or more storage devices storing instructions that are operable, when executed by the one or more computers, to cause the one or more computers to perform operations comprising:

receiving, through a graphical interface on a mobile device, a user input that corresponds to a selection of a graphical item that is located in a first portion of the graphical interface and that represents a collection of media files;

while receiving the selection input, receiving, through the graphical interface, a translation input that corresponds to a drag of the graphical item that represents the collection of media files;

while receiving the selection input and the translation input, determining that a location of the selection input is in a second portion of the graphical interface that includes a representation of a playlist;

based on determining that the location of the selection input is in the second portion of the graphical interface that includes the representation of the playlist and while receiving the selection input:

determining that, if the selection input ceased while the location of the selection input is in the second portion of the graphical interface that includes the representation of the playlist, that a representation of each media file in the collection of media files would be displayed in the representation of the playlist and would each be user-selectable; and updating the graphical item that represents the collection of media files by providing, in place of the graphical item, the representation of each media file in the collection of media files;

determining that the selection input has ceased; and based on determining that the selection input has ceased, providing, for display in the representation of the playlist, the representation of each media file in the collection of media files, wherein each representation of each media file is user-selectable.

9. The system of claim 8, wherein the first portion of the graphical interface corresponds to a first application and the second portion of the graphical interface that includes the representation of the playlist corresponds to a second, different application.

10. The system of claim 9, wherein the operations further comprise:

in response to receiving, through the graphical interface, the translation input that corresponds to a drag of the graphical item, accessing an object represented by the graphical item;

receiving, from the first application, first instructions for rendering the object while receiving the selection input; and while receiving the selection input and the translation input, rendering the object according to the first instructions.

11. The system of claim 9, wherein the operations further comprise:

in response to determining that the location of the selection input is in the second portion of the graphical interface that includes the representation of the playlist, receiving, from the second application, second instructions for rendering the object while receiving the selection input, wherein determining that, if the selection input ceased while the location of the selection input is in the second portion of the graphical interface that includes the representation of the playlist, that the representation of each media file in the collection of media files would be displayed in the representation of the playlist and would each be user-selectable is based on the second instructions.

12. The system of claim 9, wherein the operations further comprise:
determining that the second application is configured to provide multiple changes to the graphical item,
wherein determining that, if the selection input ceased while the location of the selection input is in the second portion of the graphical interface that includes the representation of the playlist, that the representation of each media file in the collection of media files would be displayed in the representation of the playlist and would each be user-selectable comprises selecting the change to the graphical item from among the multiple changes to the graphical item.

13. The system of claim 12, wherein the change to the graphical item from among the multiple changes to the graphical item is selected based on user input.

14. The system of claim 8, wherein the first portion of the graphical interface corresponds to a first section of an application and the second portion of the graphical interface that includes the representation of the playlist corresponds to a second, different section of the application.

15. A non-transitory computer-readable medium storing software comprising instructions executable by one or more computers which, upon such execution, cause the one or more computers to perform operations comprising:
receiving, through a graphical interface on a mobile device, a user input that corresponds to a selection of a graphical item that is located in a first portion of the graphical interface and that represents a collection of media files;
while receiving the selection input, receiving, through the graphical interface, a translation input that corresponds to a drag of the graphical item that represents the collection of media files;
while receiving the selection input and the translation input, determining that a location of the selection input is in a second portion of the graphical interface that includes a representation of a playlist;
based on determining that the location of the selection input is in the second portion of the graphical interface that includes the representation of the playlist and while receiving the selection input:
determining that, if the selection input ceased while the location of the selection input is in the second portion of the graphical interface that includes the representation of the playlist, that a representation of each media file in the collection of media files would be displayed in the representation of the playlist and would each be user-selectable; and
updating the graphical item that represents the collection of media files by providing, in place of the graphical item, the representation of each media file in the collection of media files;
determining that the selection input has ceased; and
based on determining that the selection input has ceased, providing, for display in the representation of the playlist, the representation of each media file in the collection of media files, wherein each representation of each media file is user-selectable.

16. The medium of claim 15, wherein the first portion of the graphical interface corresponds to a first application and the second portion of the graphical interface that includes the representation of the playlist corresponds to a second, different application.

17. The medium of claim 15, wherein the first portion of the graphical interface corresponds to a first section of an application and the second portion of the graphical interface that includes the representation of the playlist corresponds to a second, different section of the application.

18. The medium of claim 16, wherein the operations further comprise:
in response to receiving, through the graphical interface, the translation input that corresponds to a drag of the graphical item, accessing an object represented by the graphical item;
receiving, from the first application, first instructions for rendering the object while receiving the selection input; and
while receiving the selection input and the translation input, rendering the object according to the first instructions.

19. The medium of claim 16, wherein the operations further comprise:
in response to determining that the location of the selection input is in the second portion of the graphical interface that includes the representation of the playlist, receiving, from the second application, second instructions for rendering the object while receiving the selection input,
wherein determining that, if the selection input ceased while the location of the selection input is in the second portion of the graphical interface that includes the representation of the playlist, that the representation of each media file in the collection of media files would be displayed in the representation of the playlist and would each be user-selectable is based on the second instructions.

20. The medium of claim 16, wherein the operations further comprise:
determining that the second application is configured to provide multiple changes to the graphical,
wherein determining that, if the selection input ceased while the location of the selection input is in the second portion of the graphical interface that includes the representation of the playlist, that the representation of each media file in the collection of media files would be displayed in the representation of the playlist and would each be user-selectable comprises selecting the change to the graphical item from among the multiple changes to the graphical item.

\* \* \* \* \*

UNITED STATES PATENT AND TRADEMARK OFFICE
CERTIFICATE OF CORRECTION

PATENT NO. : 10,444,975 B2  
APPLICATION NO. : 15/652492  
DATED : October 15, 2019  
INVENTOR(S) : Murphy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this  
Eleventh Day of August, 2020

Andrei Iancu  
*Director of the United States Patent and Trademark Office*